United States Patent
Colynuck et al.

(10) Patent No.: US 11,280,373 B2
(45) Date of Patent: Mar. 22, 2022

(54) COATED BEARING COMPONENTS

(71) Applicant: SCHAEFFLER TECHNOLOGIES AG & CO. KG, Herzogenaurach (DE)

(72) Inventors: Allen Colynuck, Brantford (CA); Richard Hesler, Stratford (CA)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/969,383

(22) PCT Filed: Feb. 12, 2019

(86) PCT No.: PCT/US2019/017584
§ 371 (c)(1),
(2) Date: Aug. 12, 2020

(87) PCT Pub. No.: WO2019/160836
PCT Pub. Date: Aug. 22, 2019

(65) Prior Publication Data
US 2020/0400192 A1 Dec. 24, 2020

Related U.S. Application Data

(60) Provisional application No. 62/629,938, filed on Feb. 13, 2018.

(51) Int. Cl.
| | |
|---|---|
| *F16C 19/22* | (2006.01) |
| *F16C 19/34* | (2006.01) |
| *F16C 33/36* | (2006.01) |
| *F16C 33/58* | (2006.01) |
| *F16C 19/36* | (2006.01) |

(52) U.S. Cl.
CPC .......... *F16C 33/366* (2013.01); *F16C 19/225* (2013.01); *F16C 19/364* (2013.01); *F16C 33/583* (2013.01); *F16C 33/585* (2013.01); *F16C 2206/04* (2013.01); *F16C 2223/14* (2013.01)

(58) Field of Classification Search
CPC ...... F16C 19/22; F16C 19/225; F16C 19/364; F16C 33/32; F16C 33/34; F16C 33/583; F16C 33/585; F16C 33/366; F16C 2206/04; F16C 2223/14
USPC ......... 384/564–565, 569, 571, 912; 148/317, 148/906
See application file for complete search history.

(56) References Cited

U.S. PATENT DOCUMENTS

| | | | |
|---|---|---|---|
| 6,357,923 B1 | 3/2002 | Sato et al. | |
| 6,966,954 B2 | 11/2005 | Rhoads et al. | |
| 7,172,343 B2 * | 2/2007 | Kinno | C23C 14/0605 384/492 |

(Continued)

FOREIGN PATENT DOCUMENTS

| | | | |
|---|---|---|---|
| CN | 107013568 A * | 8/2017 | .......... F16C 33/7826 |
| EP | 2024527 A2 | 2/2009 | |

(Continued)

*Primary Examiner* — Marcus Charles
(74) *Attorney, Agent, or Firm* — Rutan & Tucker LLP; Hani Z. Sayed

(57) ABSTRACT

A rolling element for a roller bearing. The rolling element may include a metal substrate having a surface layer. A portion of the surface layer may include a hardened nitrided layer. A diamond-like carbon (DLC) coating may be bonded directly on at least a portion of the hardened nitrided layer.

16 Claims, 3 Drawing Sheets

(56) References Cited

U.S. PATENT DOCUMENTS

| | | | |
|---|---|---|---|
| 8,070,364 B2 | 12/2011 | Beer et al. | |
| 8,157,446 B2 * | 4/2012 | Horton | F16C 33/385 |
| | | | 384/51 |
| 8,485,730 B2 * | 7/2013 | Morishita | F16C 33/583 |
| | | | 384/492 |
| 9,051,653 B2 | 6/2015 | Tsutsui et al. | |
| 9,732,408 B2 * | 8/2017 | Sanz | C22F 1/183 |
| 2004/0116242 A1 * | 6/2004 | Uchiyama | F16H 15/38 |
| | | | 476/46 |
| 2006/0126985 A1 | 6/2006 | Ochi et al. | |
| 2009/0223367 A1 * | 9/2009 | Dando | B01D 53/685 |
| | | | 95/90 |
| 2009/0245706 A1 | 10/2009 | Morishita et al. | |
| 2009/0304321 A1 | 12/2009 | Horton et al. | |
| 2012/0077657 A1 * | 3/2012 | Yu | F16C 33/34 |
| | | | 492/49 |
| 2013/0209006 A1 | 8/2013 | Kolev et al. | |
| 2013/0343690 A1 * | 12/2013 | Kobayashi | F16C 19/225 |
| | | | 384/569 |
| 2014/0185977 A1 * | 7/2014 | Sanz | F16C 33/62 |
| | | | 384/565 |

FOREIGN PATENT DOCUMENTS

| | | | | |
|---|---|---|---|---|
| EP | 1774187 B1 | 2/2010 | | |
| EP | 1774188 B1 | 12/2010 | | |
| EP | 3106533 A1 * | 12/2016 | | F01L 3/08 |
| JP | 2001 304275 | 10/2001 | | |
| JP | 2005 155839 | 6/2005 | | |
| JP | 2006257466 A | 9/2006 | | |
| WO | WO-2014015165 A1 * | 1/2014 | | C23C 16/26 |

* cited by examiner

COATED BEARING COMPONENTS

CROSS-REFERENCE TO RELATED APPLICATION

This application is the U.S. National Phase of PCT/US2019/017584 filed Feb. 12, 2019, which claims priority to U.S. Provisional Application No. 62/629,938 filed Feb. 13, 2018, the disclosures of which are incorporated in their entirety by reference herein.

TECHNICAL FIELD

The present disclosure relates generally to coated bearing components and methods for forming the same.

BACKGROUND

Rolling element bearing assemblies are typically circular in shape, and generally include rolling elements, normally contained by a cage, disposed between inner and outer raceways. Rolling elements may take many forms, including spherical balls, cylindrical rollers, needle rollers, or various other configurations, such as cone-shaped tapered rollers or barrel-shaped spherical rollers. Cages are often used to contain the rolling elements and guide them throughout the rotating motion of the bearing, but are not a necessity in some configurations.

SUMMARY

In at least one embodiment, a rolling element for a roller bearing is provided. The rolling element may include a metal substrate having a surface layer, wherein at least a portion of the surface layer includes a hardened nitrided layer. A diamond-like carbon (DLC) coating may be bonded directly on at least a portion of the hardened nitrided layer.

In one embodiment, the rolling element is a tapered roller. In other embodiments, the roller element is a spherical ball, a cylindrical roller, a needle roller, or a barrel roller.

The portion of the hardened nitrided layer having the DLC coating bonded directly thereon may be located on an end face of the tapered roller. The portion of the hardened nitrided layer having the DLC coating bonded directly thereon may be located on a region of the end face that is configured to contact a rib of the roller bearing. In one embodiment, the region of the end face that is configured to contact a rib of the roller bearing is the only portion of the hardened nitrided layer that is coated with the DLC coating. In another embodiment, the rolling element includes a contact surface that is configured to contact an inner and/or outer ring of the roller bearing; and the portion of the hardened nitrided layer having the DLC coating bonded directly thereon is located on the contact surface. A portion of the hardened nitrided layer may not have the DLC coating bonded directly thereon. In another embodiment, an entire surface of the hardened nitrided layer have the DLC coating bonded directly thereon. The entire surface may be a circumferential surface of the rolling element. The DLC coating may have a hardness value of at least 900 HV1.

In another embodiment, a rolling bearing for a roller element is disclosed. The roller bearing includes an inner ring and an outer ring. The roller bearing includes a metal substrate forming a portion of the inner and/or outer rings and having a surface layer. At least a portion of the surface layer includes a hardened nitrided layer. The roller bearing further includes a diamond-like carbon (DLC) coating bonded directly on at least a portion of the hardened nitrided layer.

DETAILED DESCRIPTION

At the outset, it should be appreciated that like drawing numbers appearing in different drawing views identify identical, or functionally similar, structural elements. Furthermore, it is understood that this disclosure is not limited only to the particular embodiments, methodology, materials and modifications described herein, and as such may, of course, vary. As those of ordinary skill in the art will understand, various features illustrated and described with reference to any one of the figures can be combined with features illustrated in one or more other figures to produce embodiments that are not explicitly illustrated or described.

The terminology used herein is for the purpose of describing particular aspects only, and is not intended to limit the scope of the present disclosure, which is limited only by the appended claims. It is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments.

Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
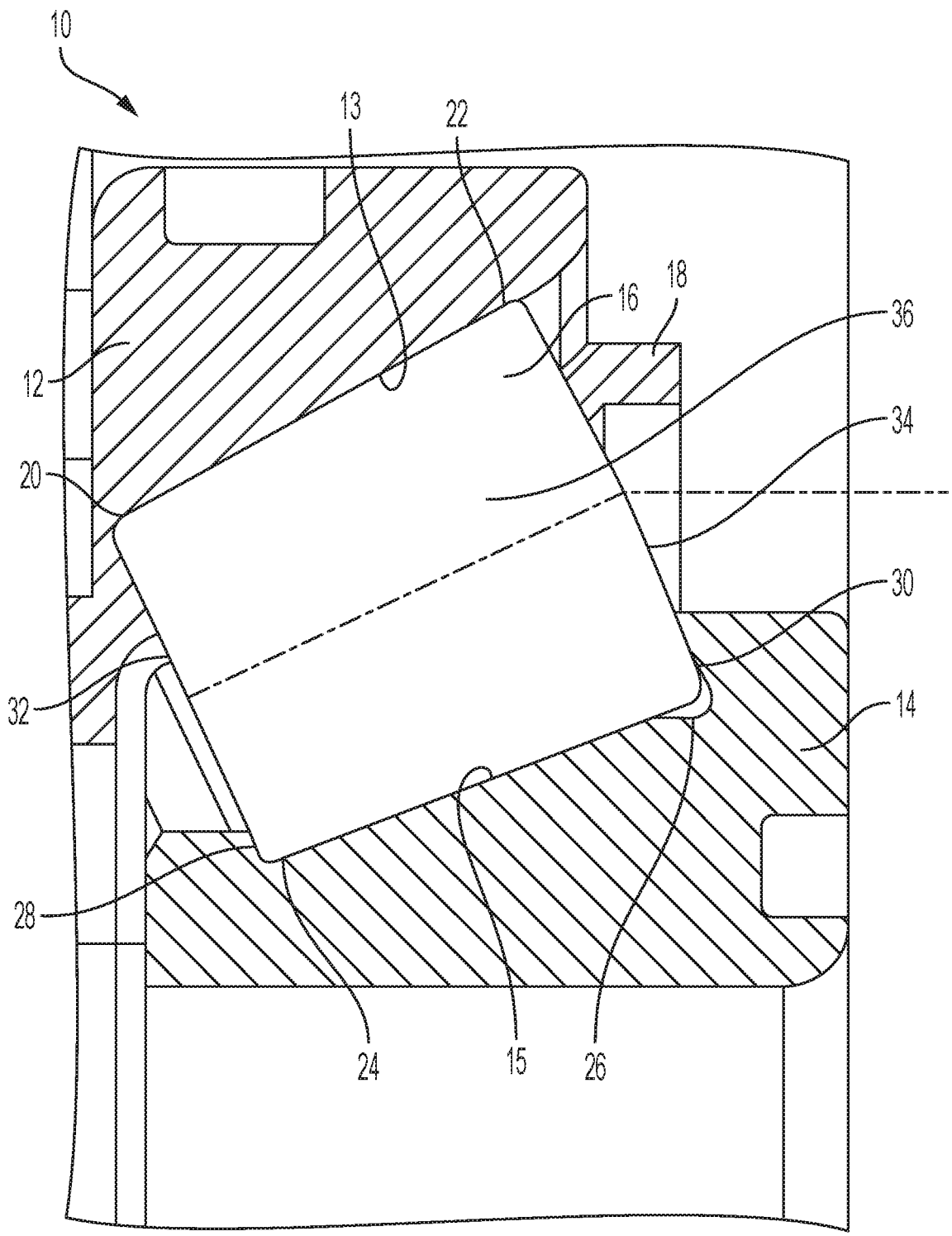
FIG. 1 is a cross-section of a tapered roller bearing, according to an embodiment.

With reference to FIG. 1, a cross-sectional view of a tapered roller bearing assembly 10 is shown that includes an outer ring 12, an inner ring 14, a plurality of tapered rollers 16, and a tapered roller cage 18. The outer ring 12 has an outer tapered roller raceway 13. The outer tapered roller raceway 13 has a small diameter end 20 and a large diameter end 22. The inner ring 14 has an inner tapered roller raceway 15. The inner tapered roller raceway 15 has a small diameter end 24 and a large diameter end 26. A rib 28 may be present on the small diameter end 24 and a rib 30 may be present on the large diameter end 26 of the inner tapered roller raceway 15. The embodiment shown includes ribs 28 and 30, however, in other embodiments, only one of the ribs may be present, or there may be no ribs. While the ribs are shown on the inner tapered roller raceway 15, there may be one or more ribs on the outer tapered roller raceway 13—either in addition to, or instead of, on the inner tapered roller raceway 15. For example, if there are no ribs on the inner raceway, there may be one or more ribs on the outer raceway. However, it is possible that either raceway has no ribs. The rib 28 on the small diameter end 24 may be present to retain the rollers on the raceway, while the rib 30 on the large diameter end 26 may be present to function as a potential thrust interface for the tapered rollers 16.

In at least one embodiment, a coating may be applied to one or more components of the bearing assembly 10. In one embodiment, the coating may be applied to the tapered rollers 16. The tapered rollers 16 may have a first end face 32, which may be the smaller end face, and a second end face 34, which may be the larger end face. The tapered rollers 16 may also have a circumferential surface 36 between the two end faces. The circumferential surface 36 may also be referred to as the roller surface of the contact surface, since it may be the surface that contacts the raceways 13 and 15. The coating may be applied to any or all of the roller surfaces—e.g., the end face 32, end face 34, and/or surface 36 (in any combination).

In addition, for any surface which receives the coating, the surface may be completely or only partially coated. For example, if the inner ring 14 includes a rib 28 or rib 30, the portion of the end faces 32 and/or 34 that will contact the ribs may be coated. In one embodiment, only the portions of the end faces that will contact the ribs may be coated. In another embodiment, at least the portions of the end faces that will contact the ribs may be coated. In another embodiment, the entire end face 32 and/or entire end face 34 may be coated. The coating may be selectively applied to the tapered rollers 16 in other manners. For example, certain radial sections of either end face may be selectively coated or uncoated. For example, the outer 50% of the radial area (e.g., area where r=0.5R or greater, where r is the radius from the roller axis and R is the max radius) may be coated and the inner 50% of the radial area may be uncoated.

In addition to, or instead of, the coating being applied to the rollers, the coating may be applied to other bearing components, such as the outer ring 12 and/or the inner ring 14. In one embodiment, the coating may be applied to the outer raceway 13 and/or the inner raceway 15. In another embodiment, the coating may be applied to the portions of the ribs 28 and/or 30 that are configured to contact the tapered rollers 16. In another embodiment, the coating may be applied to any or all areas that are configured to undergo rolling or sliding contact with another bearing component.

While FIG. 1 shows a tapered roller bearing, the coating may be applied to roller bearings having any type of rolling elements, such as those with spherical balls, cylindrical rollers, needle rollers, or various other configurations, such as barrel-shaped spherical rollers. One of ordinary skill in the art will, based on the present disclosure, understand that the coating may be applied to the corresponding areas of these different bearing types. For example, the end faces described for the tapered rolling bearing may be analogous to end faces for a cylindrical, needle, or barrel roller.

In at least one embodiment, the coating may be a tribological coating having beneficial friction and/or wear properties. The coating may have a high hardness value, such as at least 900 HV1 or at least 950 HV1. In one embodiment, the coating may be a diamond-like carbon coating, or DLC coating. In general, DLC coatings are formed of an amorphous carbon material that has similar properties to that of diamond. DLC coatings typically include large amounts of $sp^3$ hybridized carbon atoms. DLC coatings may be applied using various methods, including different base adhesion layers and including physical or vapor deposition (PVD or CVD) processes such as sputtering, ion beam, cathodic arc, electron beam, lasers, plasma-assisted CVD (PACVD), or others.

While the coating may provide tribological improvements to the bearing components, it has been found that coating delamination may occur in some circumstances when damage occurs from contamination (e.g., hard particles). The coating may be more brittle than the underlying substrate (e.g., steel), which may cause the coating to chip or flake if the substrate is plastically deformed underneath the coating. It has been discovered that hardening the substrate surface prior to applying the coating may make the substrate more robust and improve the resistance to hard particle damage.

Figure 2:
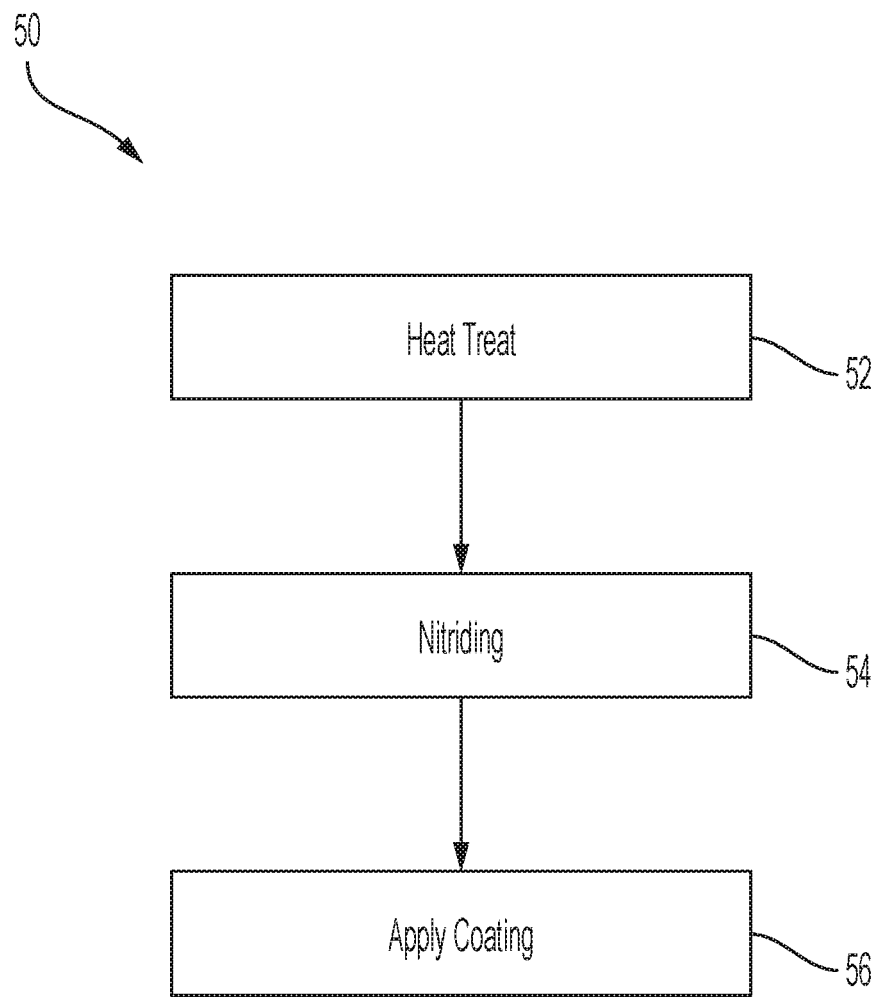
FIG. 2 is an example flowchart for a method of coating a bearing component, according to an embodiment.

With reference to FIG. 2, in at least one embodiment, a method 50 is disclosed for forming a coating on a bearing component. As used herein, the term bearing component may include the components described above, such as the bearing inner/outer rings and rolling elements (e.g., tapered roller, balls, cylindrical rollers, etc.), or other bearing components. In step 52, the bearing component may be heat treated, for example, to harden the substrate. The bearing component may be formed of a metal, such as steel, which may be hardenable by heat treatment. The heat treatment may include heating the component to above the critical temperature to form austenite (e.g., austenitizing) and then quenching to form a harder microstructure, such as martensite, bainite, or mixtures thereof. The component may then be tempered to increase the ductility/toughness of the component.

In step 54, a surface hardening process may be performed on the component. The surface hardening process may be performed on one or more surfaces of the component, including any or all of the surfaces described above. For example, the surface may be an end face of a rolling element (e.g., tapered roller), a contact surface of a rolling element, a rib contact surface of a bearing ring, a raceway of a bearing ring, or other surfaces. In another embodiment, if the component is a rolling element, the entire rolling element surface may be surface hardened. If the component is a bearing ring (inner or outer), the entire ring may be surface hardened.

In at least one embodiment, the surface hardening process may include nitriding. Nitriding generally refers to a process wherein nitrogen is diffused into the surface of the component to create a case-hardened surface. Nitriding is often performed as part of a heat treatment process. The depth of the nitrogen diffusion may at least partially determine the case depth and corresponding hardness increase. Any type of nitriding may be used to perform the surface hardening process in the present disclosure, such as gas nitriding or plasma nitriding. In one embodiment, the nitriding process may be performed at a temperature of 400 to 600° C. (e.g., for plasma nitriding). In one embodiment, the nitriding process may result in a component having a hardness of at least 750 HV0.3 at a depth of 0.04 mm below the nitrided surface. In another embodiment, the nitriding process may result in a component having a hardness of at least 800 HV0.3 at a depth of at least 0.04 or 0.2 mm below the nitrided surface.

In step 56, the coating (e.g., tribological coating) may be applied to at least one surface that was hardened (e.g., by nitriding) in step 54. The coating may be applied to all of the hardened surface(s), to part of the hardened surface(s), or to more than the hardened surface(s). Stated another way, there may be hardened surfaces that do not receive the coating thereon and/or the coating may be applied to portions of the substrate that were not hardened. However, there may be at least one or more surfaces that were hardened and that subsequently received the coating. The surfaces that may receive the coating are those described above—e.g., rolling element end faces or contact surfaces, bearing inner/outer rings, raceways, ribs, etc. In one embodiment, the coating may be a DLC coating. The coating may be applied using any suitable DLC coating process, such as PVD or CVD.

While heat treating step 52, nitriding step 54 and coating application step 56 are described as parts of method 50, other steps may be included in method 50. For example, material removing steps may be carried out before or after treating step 52, nitriding step 54 and/or coating application step 56. Non-limiting examples of material removing steps include grinding, turning and tumbling.

Figure 3:
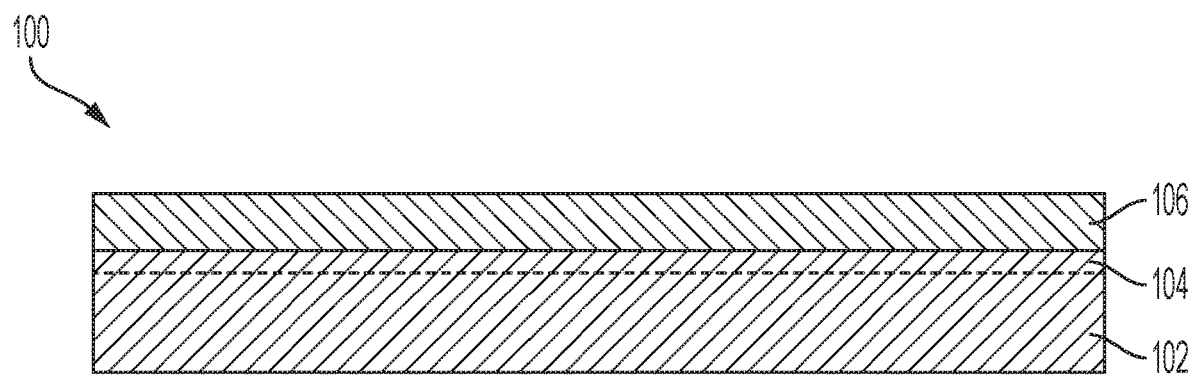
FIG. 3 is a schematic cross-section of a bearing component having a hardened surface and a coating applied thereto, according to an embodiment.

With reference to FIG. 3, a schematic cross-section of a coated bearing component 100 is shown. The portion illustrated may be a portion that received a hardening treatment and a subsequent coating. The bearing component includes a substrate 102, which may be formed of a metal, such as steel. The substrate 102 has a hardened surface layer 104, which may be a nitrided layer. Since nitriding is a diffusion-based process, the layer 104 may not be a distinct layer, and is therefore identified by a dashed line. Covering the hardened surface layer (e.g., nitrided layer) is a tribological coating 106, which may be a DLC coating.

As shown in FIG. 3, the tribological coating may be in direct contact with the hardened surface layer 104. As used herein, "direct contact" may refer to the tribological layer being in contact with the hardened surface layer 104 with no intermediate layers therebetween. Stated another way, the tribological layer 106 may be directly bonded to the hardened surface layer 104. The bond between the layers may be chemical, mechanical, or a combination thereof, depending on the layer chemistries and/or the coating method. In one example, the bearing component is a steel component having a nitride surface layer with a DLC coating bonded directly thereto.

While the bearing component 100 may be formed of any suitable material, such as metal, several example materials are disclosed below. However, these materials are in no way intended to be limiting:

Steel having the designation M50 (AMS 6491), comprising 0.8 to 0.85% by weight of C; 4 to 4.25% by weight of Cr; 4 to 4.5% by weight of Mo; 0.15 to 0.35% by weight of Mn; 0.1 to 0.25% by weight of Si (0.0 to 0.35% by weight of Si in an alternative embodiment); 0.9 to 1.1% by weight of V; max. 0.015% by weight of P; max. 0.008% by weight of S; and comprising further alloying constituents and iron, as well as standard impurities.

Steel having the designation M50NiL (AM6278), comprising: 0.11 to 0.15% by weight of C; 4.0 to 4.25% by weight of Cr; 4.0 to 4.5% by weight of Mo; 1.1 to 1.3% by weight of V (1.1 to 1.33% by weight of V in an alternative embodiment); 3.2 to 3.6% by weight of Ni; 0.15 to 0.35% by weight of Mn; 0.1 to 0.25% by weight of Si; max. 0.015% by weight of P (max. 0.025% by weight of P in an alternative embodiment); max. 0.008% by weight of S (max. 0.015% by weight of S in an alternative embodiment); and comprising further alloying constituents and iron, as well as standard impurities.

Steel having the designation 32CD V13 (AMS6481), at least comprising: 0.29 to 0.36% by weight of C; 2.8 to 3.3% by weight of Cr; 0.7 to 1.2% by weight of Mo; 0.15 to 0.35% by weight of V; 0.4 to 0.7% by weight of Mn; 0.1 to 0.4% by weight of Si; max. 0.025% by weight of P; max. 0.02% by weight of S; and comprising further alloying constituents and iron, as well as standard impurities.

Steel having the designation T1 (S 18-0-1), comprising: 0.7 to 0.8% by weight of C; 4 to 5% by weight of Cr; 17.5 to 18.5% by weight of Wo; 1 to 1.5% by weight of V; 0 to 0.4% by weight of Mn; 0.15 to 0.35% by weight of Si; max. 0.025% by weight of P; max. 0.008% by weight of S; and comprising further alloying constituents and iron, as well as standard impurities.

Steel having the designation RBD, comprising: 0.17 to 0.21% by weight of C; 2.75 to 3.25% by weight of Cr; 9.5 to 10.5% by weight of Wo; 0.2 to 0.4% by weight of Mn; 0 to 0.35% by weight of Si; 0.35 to 0.5% by weight of V; max. 0.015% by weight of P; max. 0.015% by weight of S; and comprising further alloying constituents and iron, as well as standard impurities.

Steel having the designation Pyrowear 675 (AMS5930), comprising: 0.06 to 0.08% by weight of C (0.05 to 0.09% by weight of C in an alternative embodiment); 12.8 to 13.3% by weight of Cr (12.0 to 14.0% by weight of Cr in an alternative embodiment); 1.5 to 2.0% by weight of Mo (1.5 to 2.5% by weight of Mo in an alternative embodiment); 0.5 to 0.7% by weight of V; 2.2 to 2.8% by weight of Ni (2.0 to 3.0% by weight of Ni in an alternative embodiment); 4.8 to 5.8% by weight of Co (4.0 to 7.0% by weight of Co in an alternative embodiment); 0.5 to 1.0% by weight of Mn; 0.2 to 0.6% by weight of Si (0.1 to 0.7% by weight of Si in an alternative embodiment); and comprising further alloying constituents and iron, as well as standard impurities.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE SYMBOLS

Tapered roller bearing assembly 10
Outer ring 12
Outer tapered roller raceway 13
Inner ring 14
Inner tapered roller raceway 15
Plurality of tapered rollers 16
Tapered roller cage 18
Small diameter end 20
Large diameter end 22
Small diameter end 24
Large diameter end 36
Rib 28
Rib 30
First end face 32
Second end face 34
Circumferential surface 36

Method 50
Step 52
Step 54
Step 56
Coated bearing component 100
Substrate 102
Hardened surface layer 104
Tribological coating 106

What is claimed is:

1. A tapered rolling element for a roller bearing, comprising:
   a metal substrate having a surface layer;
   at least a portion of the surface layer located on a region of the end face of the tapered rolling element including a hardened nitrided layer; and
   a diamond-like carbon (DLC) coating bonded directly on at least a portion of the hardened nitrided layer to form a surface of the DLC coating opposing a surface of the hardened nitride layer, the surface of the DLC coating is configured to contact a rib of the roller bearing.

2. The rolling element of claim 1, wherein the region of the end face is the only portion of the hardened nitrided layer that is coated with the DLC coating.

3. The rolling element of claim 1, wherein the rolling element includes a contact surface that is further configured to contact an inner and/or outer ring of the roller bearing; and
   the portion of the hardened nitrided layer having the DLC coating bonded directly thereon is located on the contact surface.

4. The rolling element of claim 1, wherein a portion of the hardened nitrided layer does not have the DLC coating bonded directly thereon.

5. The rolling element of claim 1, wherein an entire surface of the hardened nitrided layer has the DLC coating bonded directly thereon.

6. The rolling element of claim 1, wherein the roller element is a spherical ball, a cylindrical roller, a needle roller, or a barrel roller.

7. The roller element of claim 1, wherein the DLC coating has a hardness value of at least 900 HV1.

8. The roller element of claim 1, wherein the DLC coating includes $sp^3$ hybridized carbon atoms.

9. The roller element of claim 1, wherein the metal substrate has a hardness of at least 750 HV0.3 at a depth of 0.04 mm below the surface of the hardened nitride layer.

10. The roller element of claim 1, wherein the metal substrate has a hardness of at least 800 HV0.3 at a depth of 0.2 mm below the surface of the hardened nitride layer.

11. A rolling bearing for a roller element, comprising:
    an inner ring;
    an outer ring;
    a metal substrate forming a portion of the inner and/or outer rings and having a surface layer;
    at least a portion of the surface layer located on a rib of the roller bearing configured to contact the rolling element including a hardened nitrided layer; and
    a diamond-like carbon (DLC) coating bonded directly on at least a portion of the hardened nitrided layer to form an outer surface of the DLC coating opposing a surface of the hardened nitride layer, the surface of the DLC coating is configured to contact the roller element.

12. The rolling bearing of claim 11, wherein the DLC coating has a hardness value of at least 900 HV1.

13. The rolling bearing of claim 11, wherein the metal substrate has a hardness of at least 750 HV0.3 at a depth of 0.04 mm below the surface of the hardened nitride layer.

14. The rolling bearing of claim 11, wherein the rib of the roller bearing configured to contact the rolling element is the only portion of the hardened nitride layer that is coated with the DLC coating.

15. The rolling bearing of claim 11, wherein the DLC coating is applied to all areas configured to undergo rolling or sliding contact with the roller element.

16. A rolling element for a roller bearing, comprising:
    a metal substrate having a surface layer;
    at least a portion of the surface layer located on a radial portion of an end face of a tapered roller including a hardened nitrided layer; and
    a diamond-like carbon (DLC) coating bonded directly on at least a portion of the hardened nitrided layer to form a surface of the DLC coating opposing a surface of the hardened nitride layer, the surface of the DLC coating is configured to contact the roller bearing.

* * * * *